T. J. MAYALL.
METHOD OF CUTTING STRANDS FROM RATTAN.
No. 32,737. Patented July 2, 1861.
Fig. 1
Fig. 2
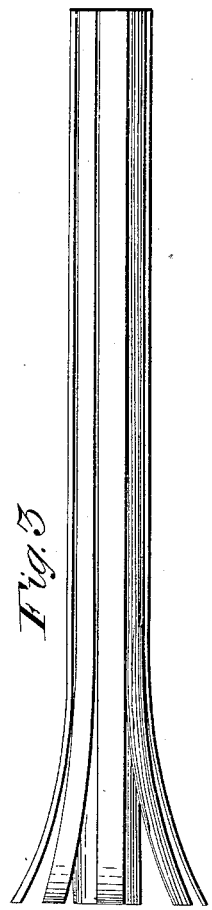
Fig. 3
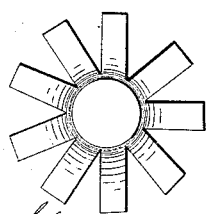
Witnesses:
Amos Broadnox
C. L. Hughes.
Inventor:
Thomas J. Mayall

UNITED STATES PATENT OFFICE.

THOMAS J. MAYALL, OF ROXBURY, MASSACHUSETTS, ASSIGNOR TO CYRUS WAKEFIELD, OF SOUTH READING, MASSACHUSETTS.

MODE OF CUTTING RATAN INTO STRANDS.

Specification of Letters Patent No. 32,737, dated July 2, 1861.

*To all whom it may concern:*

Be it known that I, THOMAS J. MAYALL, of Roxbury, in the county of Norfolk and State of Massachusetts, have invented a new and useful Method of Cutting Strands from Ratan; and I do hereby declare that the following is a full, clear, and exact description of the same, reference being had to the annexed drawing, making part of this specification, and the several figures thereof.

The object of my invention is to perfect the cutting of ratan into strands with the natural silicious surface upon them, and into a core with a circular or polygonal section; and it consists in first dividing the external glazed surface into sections or longitudinal strips and then separating them from the core or pith to form strands that may be used for seating chairs and for other purposes. This object has been hitherto attained by forcing the stick of ratan against a tubular cutter furnished with external cutting ribs or spurs that split the surface into the desired number of strands and simultaneously separates them from the interior portion of the cane. This plan of operation involves the use of expensive cutters that are speedily dulled and difficult to sharpen, and as the spurs divide the adjacent strands at the same time they are cut away from the core it is obvious that the strands are separated by the action of multiplied wedges applied internally whereby their brittle surfaces are torn or split apart with a serrated or ragged fracture. It has also been essayed to obtain the same end by subjecting the surface of the ratan to the action of gouge shaped cutters which are placed to cut into the cane and sever the bottom and both sides of each strand at once. This plan also involves the use of cutters which are difficult to sharpen and strain and tear the strands, and it is further objectionable because it has been necessary to bend the cane so that the cutter might operate upon the convex side of the curvature to separate the strand without causing it to be bent. In both of these methods and in any other that operates the cutter in a similar manner the strands will be severed by splitting in advance of the cutting edge of the knife and will therefore be liable to irregularities; and in addition any knife cutting the strand in a direction corresponding with the surface, and also, and more especially when from below toward the surface, will cause the brittle enamel of the cane to be severed with ragged or serrated edges. They therefore require to be unduly reduced in the dressing or finishing operation. This loss of labor and material can only be obviated by cutting into the surface with a knife that operates upon it and that has the interior of the cane supporting the exterior when submitted to its action.

The method constituting my invention consists in first dividing the surface of the ratan into longitudinal sections of the required width for the strands with a cutter or a series of cutters that cut the silicious surface while it is supported by the body of the ratan and that penetrate the core of the cane to the depth desired for the thickness of the strand.

Figure 1 of the drawing represents a piece of ordinary ratan which is also shown in Fig. 2 with its external surface divided into strands in the manner comprehended in the first portion of my process. The remaining feature of my invention consists in subjecting the ratan with its surface thus divided into sections to the action of a tubular or polygonal cutter which separates the surface strands from the internal cylindrical core. Fig. 3 represents the condition of a piece of ratan that has thus been partially acted upon according to the second and concluding portion of my process. The strands are therefore cut of equal and uniform width in conformity with the position of the dividing cutters and will require little or no subsequent dressing or trimming. And as the strands are not strained apart by spurs when they are separated from the core, the action of the annular cutter is more uniform and less likely to depart from a concentric position with reference to the ratan, than is the case with the ordinary spurred cutter. These two distinct operations constituting my improved method of cutting strands from ratan may be performed in different machines, or consecutively in the same machine; but the essence of the invention consists in first dividing the surface into strands with knives cutting from the outside or from the inside but without removing the strand from the stick and then separating the strands from the core. Special machines of my invention for accomplishing these purposes will form the subjects of separate applications for Letters Patent.

I now claim as my invention and desire to secure by Letters Patent—

The method herein described of first dividing the surface of ratan into longitudinal sections by cutting the stick or cane to a requisite depth and then separating said sections from the core, to form strands for caning chairs and other purposes.

In testimony whereof I have signed my name before two subscribing witnesses.

THOS. J. MAYALL.

Witnesses:
   A. POLTAK,
   A. POHLERS.